United States Patent [19]

Corl, Jr.

[11] 4,332,205
[45] Jun. 1, 1982

[54] INTERLOCKING FURNITURE ASSEMBLY AND METHOD

[75] Inventor: Robert W. Corl, Jr., Grand Rapids, Mich.

[73] Assignee: Modular Systems, Inc., Fruitport, Mich.

[21] Appl. No.: 75,311

[22] Filed: Sep. 13, 1979

[51] Int. Cl.³ .................................................. A47B 5/02
[52] U.S. Cl. ........................................ 108/60; 52/36; 108/152; 312/245; 312/263
[58] Field of Search ........... 312/263, 264, 265, 257 R, 312/245; 108/152, 60, 61; 52/36; 217/7, 10; 211/184; 151/41.7

[56] References Cited

U.S. PATENT DOCUMENTS

| | | |
|---|---|---|
| 735,618 | 8/1903 | Tannewitz . |
| 742,525 | 10/1903 | Tower . |
| 747,683 | 12/1903 | Clark . |
| 1,250,597 | 12/1917 | Kyle . |
| 1,351,119 | 8/1920 | Ogden . |
| 1,533,724 | 4/1925 | Clarke-James . |
| 1,759,178 | 5/1930 | Weldon . |
| 1,940,969 | 12/1933 | Randall . |
| 2,245,751 | 6/1941 | Blackmore . |
| 2,278,708 | 4/1942 | Miller ..................................... 29/148 |
| 2,427,012 | 9/1947 | Lum ....................................... 312/112 |
| 2,438,051 | 3/1948 | Hennessey . |
| 2,708,292 | 5/1955 | Budai . |
| 2,882,110 | 4/1959 | Mutchnik . |
| 2,970,677 | 2/1961 | Springs, Jr. et al. . |
| 3,110,934 | 11/1963 | Triplett . |
| 3,143,981 | 8/1964 | Tassell ................................. 108/108 |
| 3,159,440 | 12/1964 | Courtwright ....................... 312/263 |
| 3,160,189 | 12/1964 | Hughes . |
| 3,178,775 | 4/1965 | Tassell . |
| 3,178,987 | 4/1965 | Reese et al. . |
| 3,179,257 | 4/1965 | Tassell ................................. 211/148 |
| 3,190,243 | 6/1965 | Pira ...................................... 108/152 |
| 3,239,988 | 3/1966 | Meyer ................................... 52/718 |
| 3,247,332 | 4/1966 | McHugh . |
| 3,250,584 | 5/1966 | Tassell ................................. 312/255 |
| 3,265,344 | 8/1966 | Ornstein ............................. 248/243 |
| 3,270,995 | 9/1966 | Shears ................................. 248/224 |
| 3,276,399 | 10/1966 | Canfield ............................... 108/60 |
| 3,288,192 | 11/1966 | Bollinger . |
| 3,295,474 | 1/1967 | Ornstein ............................. 108/152 |
| 3,297,916 | 1/1967 | Wright . |
| 3,300,917 | 1/1967 | Bartley et al. ......................... 52/36 |
| 3,332,182 | 7/1967 | Mark .................................... 52/127 |
| 3,333,555 | 8/1967 | Kapnek ............................... 108/152 |
| 3,339,953 | 9/1967 | Bohn . |
| 3,362,610 | 1/1968 | Van Dyke . |
| 3,381,636 | 5/1968 | Saiberlich . |
| 3,430,674 | 3/1969 | Forbush . |
| 3,434,521 | 3/1969 | Flora . |
| 3,462,114 | 8/1969 | O'Dell . |
| 3,512,328 | 5/1970 | Eriksson ............................... 52/617 |
| 3,592,344 | 7/1971 | Schade ................................. 211/42 |
| 3,606,506 | 9/1971 | Ungaro ............................... 312/111 |
| 3,645,162 | 2/1972 | Welch . |
| 3,755,979 | 9/1973 | Pantazi ................................. 52/204 |
| 3,807,572 | 4/1974 | Luvara et al. ....................... 211/10 |
| 3,869,992 | 3/1975 | Kramer ................................ 108/60 |
| 3,894,377 | 7/1975 | Welch .................................. 52/584 |
| 3,996,718 | 12/1976 | Welch .................................. 52/756 |
| 4,021,089 | 5/1977 | Bush ................................. 312/257 R |
| 4,055,373 | 10/1977 | Andresen et al. ................... 312/263 |

FOREIGN PATENT DOCUMENTS 569971 6/1964 Belgium .
573285 3/1959 Canada .
1349422 12/1963 France .

*Primary Examiner*—James T. McCall
*Attorney, Agent, or Firm*—Price, Heneveld, Huizenga & Cooper

[57] ABSTRACT

The specification discloses a furniture assembly including interlocked panels such as dividers and shelves and a method for assembling same. The assembly includes one panel joined to a series of other panels and moveable between partially assembled and fully assembled positions. A second of the other panels is aligned with fasteners on the partially assembled panel and locked in position by movement of the one panel to its fully assembled position. The second panel is thus secured in two separate planes. The moveable, locking panel includes access openings to its fasteners to both facilitate mounting and allow later disassembly. Preferably, concealed, recessed, slidably engageable slotted clips and headed screws are used as fasteners.

22 Claims, 14 Drawing Figures

INTERLOCKING FURNITURE ASSEMBLY AND METHOD

BACKGROUND OF THE INVENTION

This invention relates to furniture units which may be assembled from individual panels in interlocking relationships and, more particularly, to furniture assemblies using one panel moved to a final position to lock other panels in place.

Certain prior furniture constructions, such as those shown in U.S. Pat. Nos. 3,451,362 and 3,634,983, both of which are commonly assigned to the owner of the present application, have utilized recessed fasteners to interlock various panels together into a furniture unit. Typically, such units include a back panel, a pair of vertical side panels and a desired number of horizontal shelves. Such units may be used as public phone booths or the like. In these constructions, certain of the recesses in which fasteners were located included openings to other surfaces allowing portions of the fasteners to be inserted therethrough during the assembly procedure. Others of the constructions utilized no such openings but required flexing and bending of certain of the panels during the assembly procedure. This latter type of construction guarded against vandalism and disassembly especially for structures used in public places.

A third type of construction using interlocking panels with recessed fasteners is shown in commonly assigned U.S. patent application Ser. No. 825,206, filed Aug. 17, 1977, entitled FURNITURE UNITS WITH CONCEALED FASTENERS AND METHOD THEREFOR, invented by Montgomery J. Welch, now U.S. Pat. No. 4,178,047. This latter type of construction includes completely concealed fasteners after assembly and includes no openings to the fasteners which are visible after assembly. Because of the elimination of access openings to the fastener recesses, the methods and sequence of assembly of the panels in this type of construction are very precise. Although several assemblies in this type of construction utilize panels moved into place to prevent the removal of other panels, the prior structures did not provide for insertion and support of intermediate or smaller panels on panel fasteners locked in place when another panel inserted by means of access openings facilitating assembly and disassembly was moved on its own fasteners.

Therefore, a need became apparent for an ability to strengthen the assembly units and support other panels such as dividers or shelves therein, especially intermediate other panels. The present invention provides an improved furniture assembly as a solution for this need.

SUMMARY OF THE INVENTION

Accordingly, the present invention provides a furniture assembly including interlocked panels and a method for assembling same in which one panel is supported and locked in a secure, strong position intermediate other panels by means of fasteners secured in two separate planes. The structure provides additional support for the panels to which the one panel is interlocked. Assembly and disassembly is determined by a predetermined panel which is moved into a final, fully assembled position to lock the one panel in place. In the preferred embodiments, when concealed, recessed fasteners are used, the invention provides secure support for such interlocked panels while avoiding visible fasteners thereby increasing the asthetics of the finished unit.

In one form, the invention is a furniture assembly including first, second, third and fourth panels. The first panel is secured to the second panel while the third panel is removeably secured to the first panel. The fourth panel is removeably secured to both the second and third panels. First fastening means are provided for slidably securing the first and third panels together and for allowing sliding movement of the third panel between a partially assembled position and a fully assembled position. The third panel includes access means on at least two surfaces for allowing access to the first fastening means from each of two surfaces to facilitate assembly and disassembly of the third panel with the other panels. Second fastening means are also provided for securing one portion of the fourth panel to the second panel as well as third fastening means for slidably securing another portion of the fourth panel to the third panel. The third fastening means are aligned for securement when the first fastening means is in its partially assembled position. The third fastening means are fully secured to lock the fourth panel to the second and third panels when the third panel is moved to its fully assembled position. This, the first, second and third fastening means prevent removal of the fourth panel from the second and third panels until the third panel is in its partially assembled position.

In more specific forms of the invention, the third panel is supported intermediate the first and a fifth panel which are parallel to one another by means of slidably engaged, recessed fasteners including slotted clips and headed screws with a portion of the fasteners received through the access means into recesses in the third panel.

In another form, the invention is a method for assembling furniture in which the third panel is positioned in its partially assembled position on the first panel with recessed fastening means for slidably securing them together. A third panel is positioned by inserting a portion of the slidably secured fastening means into a recess in the third panel through at least one of two openings in two different surfaces of the third panel. A fourth panel is secured to the second panel such that other slidably securable fastening means are aligned for engagement between the third and fourth panels. The third panel is then moved to its fully assembled position such that it slidably engages the fastening means and the other fastening means to lock the fourth panel in position.

Accordingly, the present invention provides secure rigid, strong support for a panel using fasteners in at least two planes while providing additional support for other panels interlocked therewith. Moreover, the invention provides a unit which must be assembled or disassembled in a predetermined fashion while avoiding, to as great an extent as possible, visible fasteners which would interrupt the asthetic lines of the finished unit.

These and other objects, advantages, purposes and features of the invention will become more apparent from a study of the following description taken in conjunction with the drawings.

DESCRIPTION OF THE PREFERRED EMBODIMENTS

Figure 1:
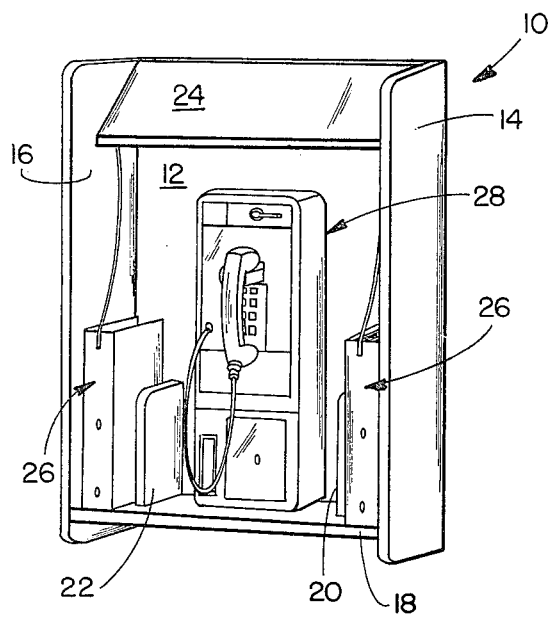
FIG. 1 is a perspective view of a completed furniture assembly of the present invention in the form of a public telephone booth secured to a wall and supporting a public telephone and telephone books.

Referring now to the drawings in greater detail, FIG. 1 illustrates a preferred form of the furniture assembly of the present invention in the form of a public telephone booth 10. Booth or furniture unit 10 includes a vertically oriented, generally planar back panel 12 secured to a wall or other surface and having side panels 14, 16 secured to opposing, parallel side edges. A bottom shelf or horizontal panel 18 is secured intermediate side panels 14, 16 while a pair of smaller, vertical dividers or "J" panels 20, 22 are interlocked intermediate back panel 12 and bottom shelf 18. Panels 20, 22 are parallel to side panels 14, 16. An angled or slanted top shelf 24 is secured intermediate the upper ends of side panels 14, 16 to provide a rest or support on which telephone books 26 may be supported and opened by the user of the booth. A coin type public telephone 28 is secured through back panel 12 to the wall surface to which the unit is secured intermediate vertical divider panels 20, 22.

The present invention is an improvement in furniture construction allowing support of intermediate panels such as vertical dividers 20, 22 in a manner which interlocks them with back panel 12 and bottom shelf 18 to prevent their removal except when bottom shelf 18 is moved to a partially assembled position.

Preferably, the panels of the present invention are formed from planar sheets of pressed particle board, plywood, or other woods. Metal panels could also be used. For decorative purposes, each of the panels may be covered with a veneer of walnut, cherry or other wood or a synthetic layer simulating such wood or other designs or colors. In addition, the edge surfaces of each of the panels which are not used as joint surfaces may be covered with a wood grain tape or the like to complete the decorative effect.

As shown in FIGS. 1–6, 7 and 9–11, each of the individual panels in the furniture unit 10 includes opposite side surfaces which are generally planar and a plurality of edge surfaces extending intermediate the side surfaces. Generally, each of the panels is rectangular although it will be apparent that other shapes could be used. The panels lie in at least three mutually perpendicular planes while panel 24 lies in a fourth plane perpendicular to the planes of panels 14, 16 but oblique to the planes of panels 12, 18. The panels are joined at abutting joint surfaces which also lie in three mutually perpendicular planes even though the panels themselves could be curved or otherwise configured. Each abutting joint brings into engagement the side surface of one of the panels and an edge surface from an opposing panel. Thus, the inside surfaces of panels 14, 16 are secured to the vertical side edges of panel 12, the end edge surfaces of horizontal shelf 18 engage the inside side surfaces of panels 14, 16, while the back and bottom edge surfaces of dividers 20, 22 engage the vertical side surfaces and upper horizontal side surface of back 12 and shelf 18 respectively. Each of the aforementioned joints is secured together by recessed fasteners as will be more fully explained below. Although the rear edge of shelf 18 engages the vertical side surface of back 12 in the final assembled position, there is no direct attachment or securement of shelf 18 to back 12.

As will be best understood from FIGS. 7–14, each of the various panels is respectively connected to other panels by recessed, slidably engagable, flexible, resilient fasteners. Each of the panel edges which is joined by such fasteners to an opposing side surface as described above will include, in the preferred embodiment, two spaced rectangular recessed pockets of the type shown at 30 in FIG. 11. These pockets are formed by routing or other methods and include a slotted fastening clip 32 secured completely therewithin. Alternately, it is possible to secure a headed screw in such a recess 30 and the slotted clip on the opposite side surface although the recess in that modified form would be slightly longer to allow proper clip-screw engagement.

Figure 11:
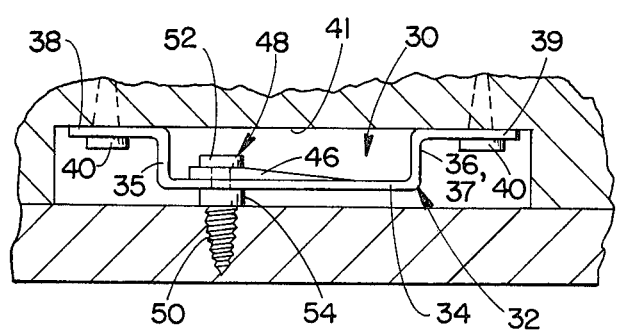
FIG. 11 is a fragmentary, sectional, enlarged view of one of the recessed slotted clip and headed screw fastening means used to secure the panels in the furniture unit shown in FIGS. 1–6.
Figure 12:
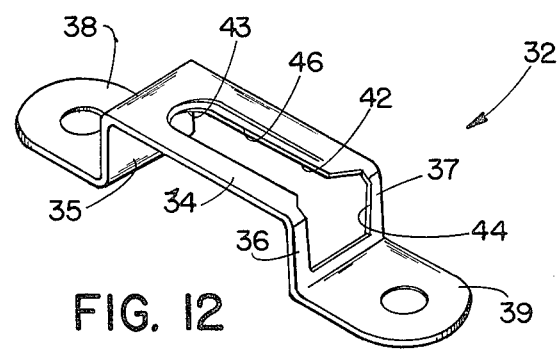
FIG. 12 is a perspective view of the slotted clip shown in FIG. 11.

Clip 32 is of the type described in U.S. Pat. Nos. 3,491,820 and 3,634,983, the disclosures of which are hereby incorporated by reference. As shown in FIGS. 11 and 12, clip 32 includes a raised center section 34 supported by legs 35, 36 and 37 above securing flanges 38, 39 by which the clip is secured by screws 40 to the bottom 41 of recess 30. A slot 42 having a closed end 43 is formed longitudinally in raised section 34 and provided with an opening entrance 44 between legs 36, 37. The sides of slot 42 are offset below section 34 to form wedging surfaces 46 which draw the head of a screw 48 received in slot 42 downwardly as described hereinafter. On the panel surface opposite each pocket 30 is assembly 10 are secured headed, shouldered screws 48 including a shaft 50 terminating in a head 52 projecting above the surface to which the screw is attached and a shoulder 54 spaced inwardly from the head 52 which determines the depth to which the screw is inserted in the panel.

Figure 13:
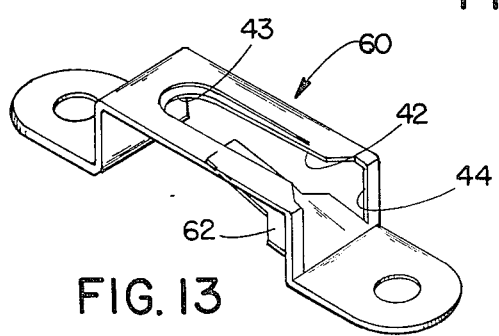
FIG. 13 is a perspective view of a modified, locking clip which may be used to assemble the unit of the present invention.
Figure 14:
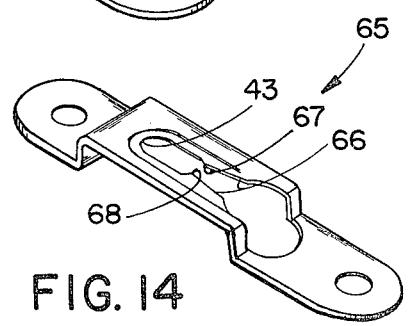
FIG. 14 is a perspective view of a second modified locking clip which may be used in the present invention.

Other types of slotted clips may also be used depending on the permanency of the assembly desired. As shown in FIG. 13, one alternative type of slotted clip 60 is similar in all respects to clip 32 but also includes a resilient, bendable, rectilinear locking flange 62 extending upwardly from the lower edge of the slot opening 44 toward the slot 42. As the screw is moved through the slot, it urges flange 62 downwardly until the screw reaches the closed end 43 of the slot. Thereafter, flange 62 springs back upwardly to engage the head or shaft of the screw and prevent withdrawal of the screw unless the flange is depressed using a screwdriver, or other tool. Clip 60 is of the type described and claimed in commonly assigned U.S. Pat. No. 3,491,820, mentioned above and incorporated by reference herein.

Another type of slotted clip 65 is of the type described and claimed in commonly assigned U.S. Pat. No. 3,894,377, the disclosure of which is herein incorporated by reference. Clip 65 is similar in all respects to clip 32 except that it also includes slot sides 66 which taper toward a minimum width slot portion at points or locking areas 67, 68. The width between points 67, 68 is slightly less than the size of the shaft of headed screw 48 between head 52 and shoulder 54. The sides 66 of the slot flex outwardly when the screw is slid therethrough to allow passage of the screw to the closed end 43 of the slot. Points 67, 68 resist withdrawal of the screw shaft until a predetermined force is applied.

Figure 9:
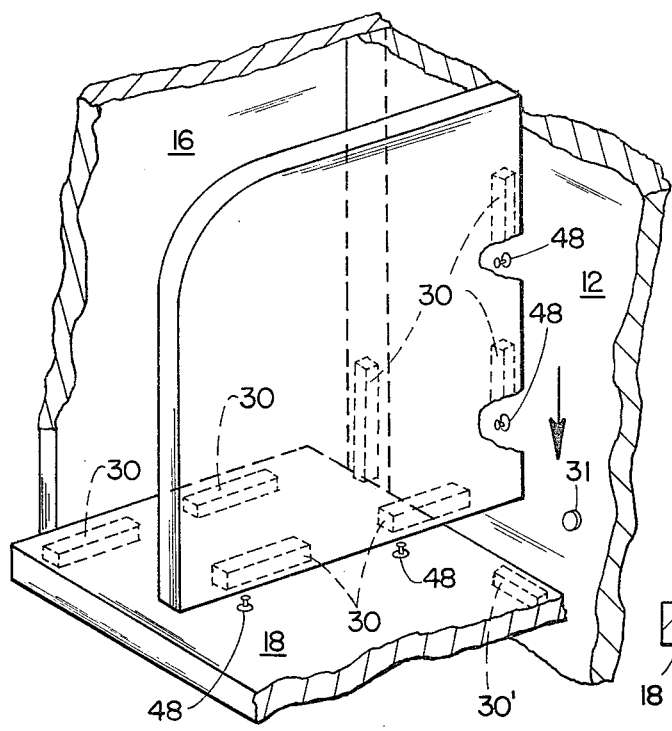
FIG. 9 is a fragmentary, perspective, enlarged view of the third step in assembling the furniture unit shown in FIGS. 1–6 showing a divider panel and the horizontal shelf in partially assembled positions.
Figure 10:
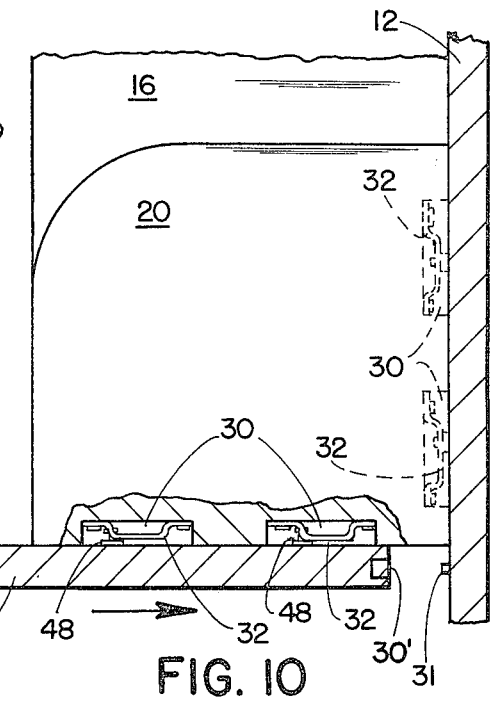
FIG. 10 is a fragmentary, sectional side elevational of the portion of the furniture unit after the assembly step shown in FIG. 9 showing the divider panel assembled but the horizontal shelf in partially assembled position.
Figure 8:
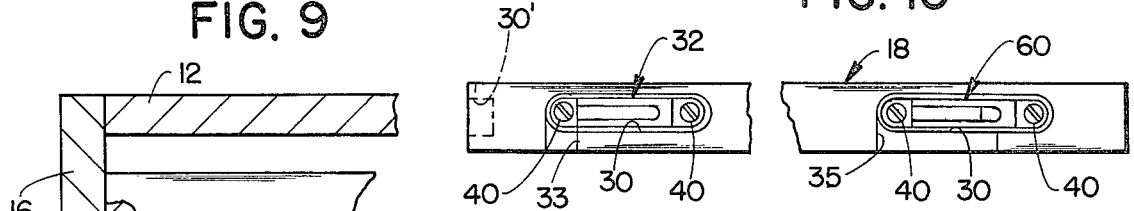
FIG. 8 is a broken, end elevation of the left end of the horizontal shelf shown in FIG. 7.

Each vertical side edge of back panel 12 includes a pair of recesses 30 of the type described above spaced near the upper and lower edges respectively. The inside surfaces of panels 14, 16 include inwardly projecting screws 48 of the type described above for mating engagement with clips of the type shown at 32, 60 or 65 described above which are mounted in recesses 30 in the back panel edges. For permanent installations, locking clips 60 are preferred in at least one of the two recesses 30 in each of the vertical side edges of back 12. Similarly, in the end edges of bottom shelf 18, two parallel recesses 30 are included in each end, at least one of which preferably includes a locking clip 60 of the type described above. (See FIG. 7). Finally, in each of the back and bottom edges of vertical divider panels 20, 22 (FIGS. 9 and 10), two recesses 30 are included. The fastener clips 32, 60 or 65 in the bottom recesses of panels 20, 22 are parallel to those in the ends of shelf 18. For disassembly of the unit, the clips used in such recesses would be of the type shown at 32 above. For permanent assembly, locking clips 60 or 65 could be used. Shelf 18 also includes similar rectangular recesses 30' in its rear edge designed to provide clearance and conceal the heads of bolts or other securing fasteners 31 utilized to mount panel 12 on a wall or other surface, as shown in FIGS. 9 and 10.

In addition, the recess in the end surfaces of shelf 18 include access openings or "windows" 33 and 35 which provide access to the recesses in the outer ends through the bottom side surface of the sheld or panel. Thus, headed fasteners 48 may be received through the openings to the recesses themselves in the end edges or through openings 33, 35 which extend perpendicular to the general opening of recesses 30. Shelf 18 is placed vertically downwardly over the inwardly projecting headed screws 48 into its partially assembled position shown in FIGS. 7, 9 and 10 by means of openings 33, 35.

Similarly, top slanted shelf 24 which also fits between side panels 14, 16, includes a pair of recesses 30 in each of its end edge surfaces. Like shelf 18, each of those recesses in each end includes a perpendicularly extending access opening such as those at 33 and 35 enabling the shelf to be fitted downwardly over a pair of screws 48 set at an angle on the inside surfaces of panels 14, 16 and slid upwardly at an angle into position against the back panel 12. Panels 14, 16 need not be flexed or bent to receive either of shelves 18 or 24 because of openings 33, 35. Openings 33, 35 also allows insertion of a screwdriver blade or other tool for disengagement of locking clips such as clips 60 to enable disassembly and removal of the panels.

Figure 2:
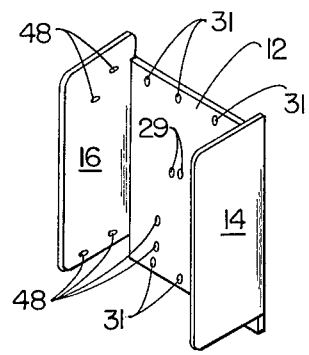
FIG. 2 is a front perspective view of a first step in the assembly process of the furniture unit shown in FIG. 1.
Figure 3:
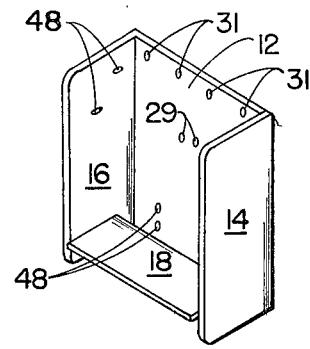
FIG. 3 is a front perspective view of a second step in the assembly of the furniture unit of FIG. 1.
Figure 4:
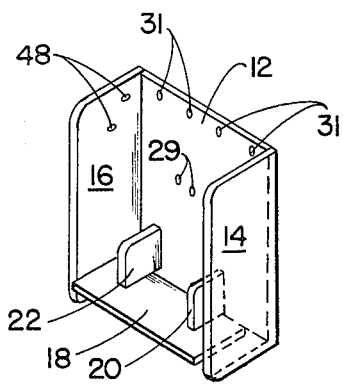
FIG. 4 is a front perspective view illustrating a third step in the assembly procedure of the unit shown in FIG. 1.
Figure 5:
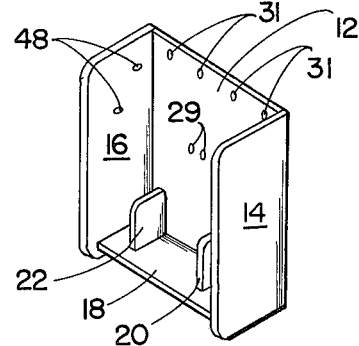
FIG. 5 is a front perspective view of a fourth step in the assembly procedure of the furniture unit shown in FIG. 1.
Figure 6:
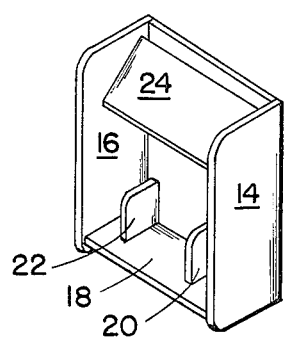
FIG. 6 is the final step in assembling the furniture unit shown in FIG. 1.
Figure 7:
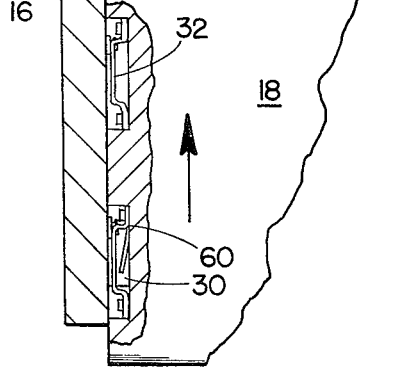
FIG. 7 is a fragmentary, sectional plan view of the horizontal shelf of the furniture unit of FIGS. 1–6 in its partially assembled position taken along plane VII—VII of FIG. 3.

Referring now to FIGS. 2-6, 7, 9 and 10, the assembly procedure for booth furniture assembly 10 is illustrated. Back panel 12 is secured to a vertical wall or other support surface via fasteners inserted through apertures 29 in the center thereof or by means of a channel (not shown) and secured along the back surface in a recess therein. After securement of back panel 12, panels 14, 16 with securing screws 48 projecting inwardly therefrom are placed against the vertical side edges of back panel 12 adjacent the openings 44 and upwardly opening slotted clips 32 in recesses 30 in those vertical edges. Panels 14, 16 are then slid downwardly to secure screws 48 in clips 32 such that panels 14, 16 are parallel to one another and project outwardly from the wall surface as shown in FIGS. 2 and 3. Thereafter, as shown in FIG. 3, horizontal shelf 18 is placed via openings 33, 35 in its partially assembled position with screws 48 adjacent openings 44 in the inwardly opening slotted clips as shown in FIG. 7. Shelf 18 remains in the partially assembled position with its front edge projecting beyond the front edges of panel 14, 16 until additional steps are completed.

Next, vertical dividers or "J" panels 20, 22 are assembled to a back panel 12 by means of outwardly projecting screws 48 from the back panel engaging downwardly opening slotted clips 32, 60 or 65 in recesses 30 as shown in FIGS. 9 and 10. The screws which secure the back edge of panels 20, 22 to back panel 12 lie in the same vertical plane as do additional screws 48 on the upper surface of shelf 18 designed to engage outwardly opening slotted clips in recesses 30 on the lower edge of panels 20, 22 as shown in FIGS. 9 and 10. Panels 20, 22 are slid downwardly until screws 48 are in alignment with clips 32 fastened in the bottom edge recess and until the bottom edge engages the top surface of shelf 18. Thereafter, shelf 18 is slid parallel to the bottoms of panels 20, 22 and rearwardly into abutment with back panel 12 such that panels 14, 16 are rigidly secured by means of the slotted clips in the end edges of shelf 18. Simultaneously, the slotted clips in the bottom recesses on panels 20 and 22 are secured by means of shoulder screws 48 projecting upwardly from the top surface of shelf 18. At the same time, recesses 30' cover securing bolts 31 on the surface of back panel 12.

The final step in the assembly is to place top, slanted shelf 24 over inwardly projecting shoulder screws 48 via access openings like those at 33, 35. Panel 24 is slid upwardly into abutment with the back panel 12 via the upwardly and inwardly opening slotted clips in its end edge recesses. Such movement of panel 24 also covers fasteners 31 along the top edge of back panel 12 as shown in FIGS. 5 and 6.

Accordingly, it will be understood that shelves 18 and 24, which are both of a length equivalent to the distance between the inside surfaces of panel 14 and 16, are inserted without any bending or flexing of panels 14, 16, over shoulder screws 48 extending inwardly which are moved into the recesses in the end surfaces of the shelves 18, 24 via the access openings 33, 35. Alignment of the dividers 20, 22 with the fasteners on the top surface of shelf 18 followed by movement of that shelf to its final, fully assembled position thereby securely locks these dividers in position by means of the fasteners extending in two planes along the back and bottom edges of the dividers. In addition, such securement rigidifies and helps support shelf 18 along with the fasteners at the end edges of that shelf. Finally, shelves 18 and 24 secure together panels 14 and 16 and prevent them from flexing laterally outwardly away from the shelves and back panel. Use of locking clips such as those at 60 or 65 along the end edges of shelf 18 also prevents its movement outwardly to its partially assembled position thereby preventing disassembly of panels 20 and 22 until panel 18 is in that position. Such outward movement is also resisted by clips 32 which include wedging surfaces 46 which resiliently engage shoulder screws 48 to resist sliding movement even though disassembly is not totally prevented if sufficient force is applied. Therefore, the completed furniture unit uses various panels interlocked with one another to form a strong, secure, rigid unit in which dividers 20, 22 need not be mounted at the ends of other panels but are securely held and locked in place in such intermediate positions as shown above.

While several forms of the invention have been shown and described, other forms will now be apparent to those skilled in the art. Therefore, it will be understood that the embodiments shown in the drawings and described above are merely for illustrative purposes, and are not intended to limit the scope of the invention which is defined by the claims which follow.

The embodiments of the invention in which an exclusive property or privilege is claimed are defined as follows.

1. A furniture assembly comprising:
   first, second, third and fourth panels; said first panel being secured to said second panel; said third panel being removeably secured to said first panel; said fourth panel being secured to said second panel and removeably secured to said third panel;
   first fastening means for slidably securing said first and third panels together and for allowing sliding movement of said third panel between a partially assembled position and a fully assembled position; said third panel having access means on at least two surfaces for allowing access to said first fastening means from each of said two surfaces to facilitate assembly and disassembly of said third panel with other panels;
   second fastening means for securing one portion of said fourth panel on said second panel;
   third fastening means for slidably securing another portion of said fourth panel to said third panel;
   said third fastening means being aligned for securement when said first fastening means is in said partially assembled position and fully secured to lock said fourth panel to said second and third panels when said third panel is moved to said fully assembled position whereby said first, second and third fastening means prevent removal of said fourth panel from said second and third panels until said third panel is in said partially assembled position.

2. The furniture assembly of claim 1 wherein at least said first and third fastening means are recessed within said panels after assembly.

3. The furniture assembly of claim 2 wherein said first, third and fourth panels each include edge and side surfaces; at least one abutting joint surface of each pair of secured panels being an edge surface while the other joint surface is a side surface; said recessed first and third fastening means each including a first portion secured to one of said edge and side surfaces of one of the two panels being joined, the other of said panels including a recess in the other of said edge and side surfaces with a second portion of said fastening means secured in said recess for slidably mating with side first portion.

4. The furniture assembly of claim 3 wherein one edge of said third panel includes said recess and second portion of said first fastening means; said access means including access openings to said recess from said edge and at least one side surface of said third panel.

5. The furniture assembly of claim 4 including a fifth panel secured parallel to and spaced from said first panel on said second panel; said third panel mounted intermediate said first and fifth panels and including a second edge parallel to said one edge; said second edge including at least one of said recesses, another of said second portions of another fastening means like said first fastening means, and access openings to said second edge recess from a side surface of said third panel which faces in the same direction as said one side surface; said fifth panel including another of said first portions of said other fastening means; said first portions being received in said edge recesses through said openings from said side surfaces of said third panel when said third panel is mounted between said first and fifth panels.

6. The furniture assembly of claim 4 wherein said first portion of said first fastening means includes a shouldered screw having a head spaced from the surface to which said screw is secured at the end of the screw shaft; a said second portion of said first fastening means including a flexible, resilient, slotted clip having a section raised above the surface to which the clip is secured and means adjacent said raised section for securing said clip to said surface, said raised section including a slot having at least one open end for receiving said head of said screw therethrough and under said raised section whereby the resiliency of said clips urges said abutting joint surfaces of said panels tightly together when said clips and screws are engaged.

7. The furniture assembly of claim 6 wherein the open end of said slot is closest to said second panel.

8. The furniture assemby of claim 3 wherein said first portion of said first and third fastening means includes a shouldered screw having a head spaced from the surface to which said screw is secured at the end of the screw shaft, a said second portion of said first and third fastening means including a flexible, resilient, slotted clip having a section raised above the surface to which the clip is secured and means adjacent said raised section for securing said clip to said surface, said raised section including a slot having at least one open end for receiving said head of said screw therethrough and under said raised section whereby the resiliency of said clips urges said abutting joint surfaces of said panels tightly together when said clips and screws are engaged.

9. The furniture assembly of claim 6 or 8 wherein said slotted clip includes wedging surfaces extending along and on either side of said slot under said raised section for drawing said respective joined panels toward one another when said panels are assembled.

10. The furniture assembly of claim 9 wherein said slotted clip also includes a slot having a closed end and a locking flange to retain said screw at said closed slot end when said screw is engaged with said clip.

11. The furniture assembly of claim 9 wherein said slot in at least one of said clips includes a closed end and flexible, resilient slot side portions tapering to a slot portion spaced from said closed end having a minimum width slightly less than the size of said screw shaft, said slot increasing in width between said minimum width portion and said closed end, said minimum width slot portion allowing passage of said screw shaft therepast due to flexing of said side portions and acting as a lock resisting withdrawal of said screw after such passage unless a sufficiently large withdrawal force is applied to move said screw away from said closed end along said slot.

12. The furniture assembly of claim 2 wherein said fourth panel is removeably secured to said second panel; said second fastening means also being recessed within at least one of said second and fourth panel after assembly.

13. The furniture assembly of claim 1 wherein said first and third fastening means are positioned parallel to one another to enable simultaneous sliding securement of said third panel to both said first and fourth panels as said third panel is moved to said fully assembled position.

14. The furniture assembly of claim 1 wherein said first and fourth panels are parallel to one another.

15. The furniture assembly of claim 14 wherein said second and third panels are perpendicular to one another and each of said first and fourth panels.

16. The furniture assembly of claim 1 including a fifth panel secured parallel to but spaced from said first panel on said second panel; said third panel being generally planar and having a length equivalent to the distance between and mounted intermediate said first and fifth panels; said access means including openings to said first fastening means extending through side surfaces of said third panel generally perpendicular to the general plane of said panel; portions of said first fastening means being receivable through said perpendicular access openings when said third panel is positioned between said first and fifth panels in said partially assembled position.

17. A furniture assembly comprising first, second, third, fourth and fifth panels each having edge and side surfaces and secured together with slidably engaged, recessed fastening means for securing an edge of one panel to a side surface of another panel;

said first and fifth panels secured to said second panel at parallel, spaced positions;

said third panel removeably secured between said first and fifth panels with a first and second of said recessed fastening means such that it is moveable between partially assembled and fully assembled positions, said third panel including access means to said first and second recessed fastening means at each end of said panel for receiving portions of said fastening means to allow insertion and fastening of said third panel intermediate said first and fifth panels without spreading or flexing said first and fifth panels apart;

said fourth panel removeably secured to said second panel with a third of said recessed fastening means; and a fourth of said recessed fastening means for securing said third and fourth panels together when said third panel is moved from its partially assembled to its fully assembled position 18. The furniture assembly of claim 17 wherein said first, fourth and fifth panels are parallel to one another and perpendicular to said second and third panels which are also perpendicular to one another.

19. A method for assembling furniture comprising:
(1) securing a first panel to a second panel;
(2) positioning a third panel on said first panel in a partially assembled position on recessed fastening means for slidably securing said first and third panels together, said positioning including inserting a portion of said fastening means into a recess in said third panel through at least one of two openings to said recess which extend through two different surfaces of said third panel;
(3) securing a fourth panel to said second panel such that other slidably secureable fastening means are aligned for engagement between said third and fourth panels;
(4) moving said third panel to a fully assembled position and slidably engaging said fastening means and said other fastening means whereby said fourth panel is locked to said second and third panels to prevent removal until said third panel is moved to said partially assembled position.

20. The method of claim 19 including a fifth panel parallel to but spaced from said first panel; positioning said third panel in its partially assembled position intermediate and perpendicular to said first and fifth panels prior to securing said fourth panel to said second panel.

21. The method of claim 19 including locking said third panel in its fully assembled position with recessed fasteners including locking means thereon.

22. The method of claim 19 including sliding said third panel parallel to an edge of said fourth panel which includes said other fastening means and perpendicular to said second panel to lock said fourth panel in its position.

* * * * *

UNITED STATES PATENT AND TRADEMARK OFFICE
CERTIFICATE OF CORRECTION

PATENT NO. : 4,332,205

DATED : June 1, 1982

INVENTOR(S) : Robert W. Corl, Jr.

It is certified that error appears in the above—identified patent and that said Letters Patent is hereby corrected as shown below:

Column 2, line 26:

"this" should be --thus--

Column 3, line 26:

"elevational" should be --elevation--

Column 4, line 64:

"is" should be --in--

Column 5, line 61:

"sheld" should be --shelf--

Column 6, line 51:

"abuttment" should be --abutment--

Column 6, line 62:

"abuttment" should be --abutment--

UNITED STATES PATENT AND TRADEMARK OFFICE
CERTIFICATE OF CORRECTION

PATENT NO. : 4,332,205
DATED : June 1, 1982
INVENTOR(S) : Robert W. Corl, Jr.

It is certified that error appears in the above—identified patent and that said Letters Patent is hereby corrected as shown below:

Column 8, Claim 3, line 14:

"side" should be --said--

Signed and Sealed this

Second Day of November 1982

[SEAL]

Attest:

Attesting Officer

GERALD J. MOSSINGHOFF
Commissioner of Patents and Trademarks